United States Patent Office 3,300,507
Patented Jan. 24, 1967

3,300,507
BENZOTHIAZOLYLBENZENE AMIDES
Christopher James Sharpe and Francis Frederick Stephens, Harrow, England, assignors to The Crookes Laboratories Limited, London, England, a British company
No Drawing. Filed Dec. 17, 1963, Ser. No. 331,132
8 Claims. (Cl. 260—304)

This invention relates to new benzothiazoles, and in particular to substituted benzothiazoles having properties useful in pharmacological compositions.

The new compounds provided by this invention possess valuable anti-inflammatory and uricosuric properties.

Accordingly the present invention provides compounds of the formula:

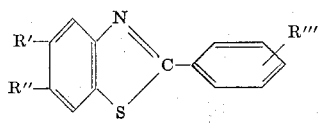

in which R and R'' represent hydrogen, halogen, a lower alkyl group or an alkoxy group and R' and R'' may be the same or different and in which R''' represents —CONRR or—SO$_2$NRR and in which R represents hydrogen or a lower alkyl group.

Preferably the group R''' is in the meta or para position in the 2-phenyl ring.

Particularly useful compounds are those in which R' and R'' are hydrogen atoms or methyl groups and in which R''' is in the para position in the 2-phenyl ring and represents —CONH$_2$, —CON(CH$_3$)$_2$, —SO$_2$NH$_2$ or —SO$_2$N(CH$_3$)$_2$.

These last mentioned compounds have been shown to possess anti-inflammatory properties in the cotton pellet test. In addition, in methods based on the gain in weight of an area of inflamed skin, these compounds have been shown to posses a low toxicity, to exert a mild analgesic action, to function as uricosuric agents and to exhibit some action as hypocholesterolaemic agents.

The new and valuable compounds provided by this invention may be prepared by standard condensation reactions such as those between suitably substituted acid chlorides or benzaldehydes and appropriate amines or aminothiophenols. Alternatively, a suitable cyano compound can be hydrolysed to form the appropriate amide.

This invention also provides a process for the preparation of the above compounds in which a substituted benzoyl chloride is reacted with a 2-aminothiophenol to produce a substituted benzthiazole.

In an alternative process a benzothiazolyl-substituted aroyl or sulphonyl chloride is reacted with an amine to produce compounds of this class.

This invention also provides therapeutic compositions comprising a compound provided by this invention together with a pharmacologically acceptable carrier or diluent.

EXAMPLE 1

4-sulphamylbenzoylchloride (12 g.) was added portionwise with shaking to a solution of 2-aminothiophenol (8.16 g.) in dimethylaniline (60 mls.). The mixture was heated on the water-bath for 45 mins., then boiled under a short air condenser for 30 minutes, steam being allowed to escape. The mixture was cooled to about 60° C. and added to a mixture of concentrated hydrochloric acid (120 mls.) and water (360 mls.). The yellow solid was collected, washed with dilute hydrochloric acid and finally with ethanol, and dried at 90°. The product (6.7 g., M.P. 263–270°) was recrystallised from methyl Cellosolve to obtain 4 g. of 2-(4'-sulphamylphenyl) benzothiazole, M.P. 272–273°.

EXAMPLE 2

A mixture of 2(4'-cyanophenyl) benzothiazole (72.4 g.), acetone (1450 mls.) and 10% sodium hydroxide solution (253 mls.) was treated with 100 vol. hydrogen peroxide (145 mls.) at a rate sufficient to give fairly vigorous effervescence. When the reaction began to subside, the mixture was heated under reflux for 15 minutes, poured into 4 volumes of water and the crude product (65 g., M.P. 254–255°), recrystallized from dioxan to obtain 56.6 g. of 2-(4'-benzamide) benzothiazole as a white solid, M.P. 256–257°.

EXAMPLE 3

*2-(4'N,N-dimethyl benzamide) benzothiazole*

4'-(2-benzothiazolyl) benzoyl chloride (1.0 g., 3.7 mmole) was suspended in refluxing acetone (50 ml.) and 30% aqueous dimethylamine (4.0 ml., approximately 4-fold excess) added in one portion down the condenser. Reaction occurred with rapid solution of the solid. After 1 hour's reflux, most of the solvent was removed and excess of water added. The solid was filtered and washed to give 1.0 g. (97%) white powder, sintering at 164, M.P. 166–9°. The analytical sample formed almost colourless needles (from acetone or benzene) M.P. 170.5–171.5°.

EXAMPLE 4

*2-(4'N,N-dimethyl benzenesulphonamide) benzothiazole*

A solution of 4'-(2-benzothiazolyl) benzene-sulphonyl chloride (1.0 g., 3.2 mmole) in acetone (25 ml.) was refluxed and 30% aqueous dimethylamine (3.0 ml., approximately 3-fold excess) added in one portion down the condenser. Instant exothermic reaction occurred, with formation of a crystalline precipitate. After 1 hour's reflux, the mixture was concentrated to small bulk and about 3 volumes of water were added. The solid was filtered and washed to give 1.01 g. ((99%) of colourless micro-crystals, sintering at 204°, M.P. 206–8°. Crystallisation from benzene afforded very pale yellow needles, M.P. 208.5–209.5°.

What we claim is:
1. A compound of the formula:

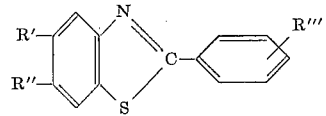

in which R' and R'' represent hydrogen, halogen or a lower alkyl group and R' and R'' may be the same or different and in which R''' represents —CORR or

—SO$_2$RR and in which R represents hydrogen or a lower alkyl group.

2. A compound as claimed in claim 1 in which the group R''' is in the meta or para position in the 2-phenyl ring.

3. A benzothiazole compound of the formula:

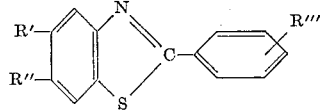

in which R' and R'' represent hydrogen or methyl and R''' represents —CONRR or —SO$_2$NRR and in which R represents hydrogen or methyl.

4. A compound as claimed in claim 3 in which R''' is in the para position in the 2-phenyl ring and represents —$CONH_2$, —$CON(CH_3)_2$, —$SO_2NH_2$ or —$SO_2N(CH_3)_2$.

5. 2-(4'-sulphamylphenyl) benzothiazole.
6. 2-(4'-benzamide) benzothiazole.
7. 2-(4'-N,N- dimethyl benzamide) benzothiazole.
8. 2-(4'-N,N- dimethyl benzenesulphonamide) benzothiazole.

References Cited by the Examiner

Elderfield: Heterocyclic Compound, vol 5, Wiley, 1957 p. 507.

Noller: Chemistry of Organic Compounds, W. B. Saunders, 1957, pp. 244–253.

ALEX MAZEL, *Primary Examiner.*

HENRY R. JILES, *Examiner.*

R. J. GALLAGHER, *Assistant Examiner.*